United States Patent
Henneken et al.

(10) Patent No.: US 6,466,854 B1
(45) Date of Patent: Oct. 15, 2002

(54) METHOD FOR CONTROLLING A HIGH TEMPERATURE OPERATING MODE OF AN ELECTRONICALLY CONTROLLED AUTOMATIC GEARBOX

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/807,776

(22) PCT Filed: Oct. 16, 1999

(86) PCT No.: PCT/EP99/07870

§ 371 (c)(1),
(2), (4) Date: Apr. 18, 2001

(87) PCT Pub. No.: WO00/25044

PCT Pub. Date: May 4, 2000

(30) Foreign Application Priority Data

Oct. 24, 1998 (DE) .......... 198 49 058

(51) Int. Cl.$^7$ .......... G06G 7/70; B60K 41/06; F16H 45/02
(52) U.S. Cl. .......... 701/65; 701/62; 477/98; 477/65
(58) Field of Search .......... 701/62, 65, 84, 701/51, 53, 54, 58, 61; 477/98, 133, 65, 109, 72, 75, 155, 156, 158, 101, 64

(56) References Cited

U.S. PATENT DOCUMENTS

| | | | |
|---|---|---|---|
| 4,449,618 A | * 5/1984 | Suga et al. | 192/3.31 |
| 4,733,581 A | 3/1988 | Hasegawa et al. | 74/864 |
| 4,807,495 A | * 2/1989 | Wallace | 74/844 |
| 4,894,780 A | * 1/1990 | Simonyi et al. | 364/424.1 |
| 5,050,717 A | * 9/1991 | Shibayama | 192/0.052 |
| 5,072,630 A | * 12/1991 | Kikuchi et al. | 74/858 |
| 5,157,991 A | * 10/1992 | Sumimoto | 74/866 |
| 5,556,349 A | 9/1996 | Ishii et al. | 477/76 |
| 5,680,307 A | 10/1997 | Issa et al. | 364/424.081 |
| 5,737,712 A | * 4/1998 | Han et al. | 701/51 |
| 5,748,472 A | 5/1998 | Gruhle et al. | 364/424.08 |
| 5,749,060 A | * 5/1998 | Graf et al. | 701/51 |
| 5,857,162 A | * 1/1999 | Vukovich et al. | 701/62 |
| 6,002,979 A | * 12/1999 | Ishizu | 701/86 |

FOREIGN PATENT DOCUMENTS

| | | |
|---|---|---|
| DE | 39 28 814 A1 | 3/1991 |
| DE | 39 22 051 C2 | 7/1993 |
| DE | 39 28 814 C2 | 7/1993 |
| DE | 197 55 128 A1 | 6/1998 |
| EP | 0 317 936 A2 | 5/1989 |
| EP | 0 751 323 A2 | 1/1997 |

* cited by examiner

*Primary Examiner*—Tan Nguyen
*Assistant Examiner*—Dalena Tran
(74) *Attorney, Agent, or Firm*—Davis & Bujold, P.L.L.C.

(57) ABSTRACT

The invention relates to a method for controlling a high-temperature operating mode of an automatic transmission wherein at least one value of an actual engine (CMO) or transmission (CGT) temperature is continuously measured. In the electronic control unit several gear shift control programs are stored and are accessed at normal operating temperatures according to an evaluation counter provided with a driving activity characteristic. It is proposed that the evaluation counter be provided with a high-temperature operating value (MAX(UDCHMMO, UDCHMGT)) with which is associated a gear shift program which also has temperature-lowering properties when the actual temperature value (CMO, CGT) is higher than a first limit value (MOMIN, GTMIN).

19 Claims, 2 Drawing Sheets

METHOD FOR CONTROLLING A HIGH TEMPERATURE OPERATING MODE OF AN ELECTRONICALLY CONTROLLED AUTOMATIC GEARBOX

The invention relates to a method for controlling a high-temperature operating mode of an electronically controlled automatic transmission.

Under certain operating conditions of the vehicle, high temperatures can be reached in the transmission. If specific temperatures limits are exceeded, parts can be damaged or undesired chemical changes of the transmission oil can take place. High temperatures appear when great amounts of hear are produced and/or only a small amount of heat is removed. Operating situations with low engine rotational speed in which liquid pumps in the cooling system are operated only at low rotational speeds so that the heat removal is limited are critical. High temperatures can also appear when a hydrodynamic converter, front-mounted on the transmission, is operated with open lock-up clutch. With an open lock-up clutch considerable, amounts of heat can be produced in the converter due to hydraulic losses. Unfavorable, in addition, is that the converter as a rule is operated with open lock-up clutch when low engine rotational speeds are present.

High temperatures can also occur on the friction surfaces of a lock-up clutch operating with a regulated slip.

Transmission controls are known in which a special temperature lowering high-temperature drive program is stored which is accessed at high temperatures of the transmission. Such a high-temperature drive program essentially modulates the heat economy of a transmission and is suited for lowering the temperature of the transmission. For a driver, it is, of course, clearly noticeable when such a high-temperature drive program is accessed: the lower gears are turned off extensively, a great consumption, the same as high noise and vibration load appear. The special high-temperature drive program comprises both a shift program for a gear change control and a converter shift program for controlling the lock-up clutch.

Due to the negative effects upon the driving operation it is desirable to access the special high-temperature drive program only when it is indispensably necessary. In EP 0 751 323 A2, it is, therefore, proposed to vary the limit temperature above which the special high-temperature shift program is accessed according to the temperature gradient. The value of the limit temperature is higher when the temperature increases only slowly. But if the limit temperature is exceeded, the driving comfort is noticeably reduced.

In DE 197 55 128 A1 it is proposed to reduce the engine torque when the transmission temperature exceeds a predetermined limited value. The consequence of this is, likewise, a very extensive limitation of the driving operation.

In addition DE 39 22 051 C2, for example, has disclosed a method for control of an automatic transmission in which in an electronic control unit for control of the gear changed several shift programs are stored which are accessed according to a driving activity characteristic. Depending on the value of the driving activity characteristic, a consumption-optimized shift program, or shift programs therebetween are accessed. However, this method cannot solve the problem of an inadmissible increase of the transmission or engine temperature.

The problem on which the invention is based is to provide a high-temperature operating mode for an electronically controlled automatic transmission in which the negative effects noticeable by the driver are reduced.

This problem is solved, according to the invention, with the features of the main claim. Sub-claims contain advantageous developments of the invention.

It is proposed, therefore, when an actual temperature value, e.g. a measured temperature of the transmission sump, is high that a first limit value, to provide an evaluation counter, which is normally provided with the driving activity characteristics, with a high-temperature operating value with which a shift program is associated in any case available which also has temperature-lowering properties The invention is based on the knowledge that a formerly performance-optimized shift program which, because of a driver's sportive drive mode, is accessed normally, that is, below the first limit temperature, also has temperature-lowering properties.

The rotational speed level of a formerly performance-optimized shift program is increased so that the hear removal is favorable and also the hydrodynamic converter is predominantly operated with closed lock-up clutch.

The shift program, which is accessed, can be a concrete shift program. In many cases, it has been found that another temperature increase can be prevented by accessing such a more performance-optimized shift program, and the effects of this high-temperature operating mode noticeable by the driver are substantially less disadvantageous.

One other advantage of the invention is the use of an always available shift program whereby storing space in the electronic control unit is spared and application expenditure is reduced.

Nevertheless, in order to prevent overheating of the aggregate under extreme operating conditions, it is advantageous that a second, high temperature limited value be provided and that a special high-temperatures shift program be directly accessed for a gear charge control when the actual temperature is higher than the second limit value. This development of the invention makes available two steps of the high-temperature operating mode. The second, higher limit value is reached only very seldom here so that the uncomfortable to drive special high-temperature shift program only very rarely has to be activated.

In automatic transmissions, having a front-mounted hydrodynamic converter with a lock-up clutch, it can be advantageous that a special high-temperature converter shift program be accessed when the actual temperature value is higher than the first temperature limited value. Therefore, while after exceeding the first limit temperature for a gear change control, a shift program in any case available is accessed which is associated with a specific value of the driving activity characteristic, a first high-temperature converter shift program is accessed for controlling the lock-up clutch. Such a high-temperature converter shift program has, in comparison, with the converter shift program used normally, that is, below the first limit temperature, an enlarged range in which the lock-up clutch is closed. But it is also possible to access the converter shift program which is normally associated with the corresponding shift program for gear change control.

When a second high-temperature converter shift program is provided which is accessed when the actual temperature value is higher than the second limit value, the same as in the shift program for gear change control, it is, likewise, possible to react gradually to higher temperatures. In the first high-temperature converter shift program, there also can be admitted for the sake of better drive ability ranges with open or regulated slipping lock-up clutch when extreme conditions are covered by the second high-temperature converter shift program.

A simple exit from the function is possible when the actual temperature value is compared with a third limit value and the evaluation counter is again provided with the actual value of the driving activity characteristic of the actual temperature value is lower than the third limit value. The third limit value is below the first limit value. By means of this temperature hysteresis, a back and forth jumping between operating states is prevented.

The heat economy of the prime mover is also modulated by the transmission control. In many cases, the engine temperature can also be lowered by an increased rotational speed level. An advantageous development of the invention provides, therefore, that both an actual transmission temperature and an actual engine temperature are continuously measured. The engine temperature value is compared with a first engine temperature limit value and the transmission temperature value with a first transmission temperature limit value. The evaluation counter is then provided with a high-temperature operating value when at least one of the temperature values of the engine or the transmission is higher than the corresponding first engine or transmission limit value.

Second engine or transmission temperature limit values can be correspondingly predetermined, a special high-temperature shift program is directly accessed for gear change when at least one of the temperature values of the engine or the transmission is higher than the corresponding second limit value.

When both the engine temperature and the transmission temperature are taken into account, it can be provided for the exit from the high-temperature operating mode that both the actual engine temperature value and the actual transmission temperature value be lower than a third engine or temperature limit value.

Since with regard to temperature reduction optimal operating conditions of the engine and the transmission can differ, it is advantageous to establish different high-temperature operating values for the engine and the transmission. The high-temperature operating value with which the evaluation counter is provided can be set equal to the maximum or equal to the medium value from the engine high-temperature operating value and the transmission high-temperature operating value.

A reaction of the transmission still better adapted to the actual temperature value is obtained by the high-temperature operating value or the high-temperature operating value being determined according to the actual engine or transmission temperature value, high-temperature operating values are assigned to high temperature values. Higher temperature values then imply higher values of the evaluation counter so that a drive program is accessed with a higher rotational speed level. If the shift programs or the shift rotational speeds are determine according to the actual value of the evaluation counter, by interpolation between adjacent shift programs, each small change of the evaluation counter produces a relative change for the shift program as consequence of a temperature increase. Therefore, a steady relationship exists between the temperature and the gear shift rotational speeds. Jumps in the transmission behavior are prevented. A temperature increase in the engine or in the transmission is counteracted gradually. The higher the temperatures, the more performance oriented the shift program is. The connection between the high temperature operating values and the temperature values can be produced in the electronic transmission control, for example, by an applicable characteristic line.

In an advantageous development of the invention, it is provided that a high temperature operating value be assigned to the evaluation counter only when the last applicable value of the evaluation counter is lower than the high-temperature operating value to be assigned. Hereby is obtained that the value of the evaluation counter during activation of the high-temperature operating mode, that is, when exceeding the first limit temperature, be not reduced. Therefore, when a shift program with high gear shift rotational speeds has already been accessed, during the preceding sporting drive mode, in many cases it does not make much sense, when the limit temperature is exceeded, to access a shift program with a lower rotational speed level. In addition, with the proposed step, it is obtained that after the first limit temperature has been exceeded, the evaluation counter can no longer be reduced while the third limit temperature is fallen below.

When the third temperature limit value, that is, the temperature at which the high-temperature operating mode is abandoned when it is falls below a pre-settable offset amount, is lower than a first or second limit value, the application is simplified. A temperature hysteresis in the form of the offset amount can be firmly predetermined.

On the basis of temperature gradients, predictions can be made concerning the temperature to be expected. Therefore, it can be advantageous, in the case of a quick temperature increase, to change already earlier, that is, at lower temperature values to a high-temperature mode for which reason it is provided in a development of the invention that from the time curve of the temperature values of engine and transmission temperature gradients be determined and that the first and second limited values be determined according to the temperature gradient or gradients, lower limit values are assigned to high temperature gradients.

In other developments of the invention, the first and second limit values are determined according to the outside temperature, the air pressure or the road gradient. Especially lower limit values are assigned to low outer temperature values, low air pressure values and high road gradient values. When, for example, despite a low outside temperature a high transmission temperature is reached, it can be concluded that very great power losses have been produced so that it is convenient to change more quickly to a high-temperature operating mode.

Finally, the driver receives a revertive indication about the transmission temperature when an optic indication appears as soon as a transmission temperature limit value has been exceeded.

The invention is explained, in detail, with reference to the enclosed drawings.

Figure 1:
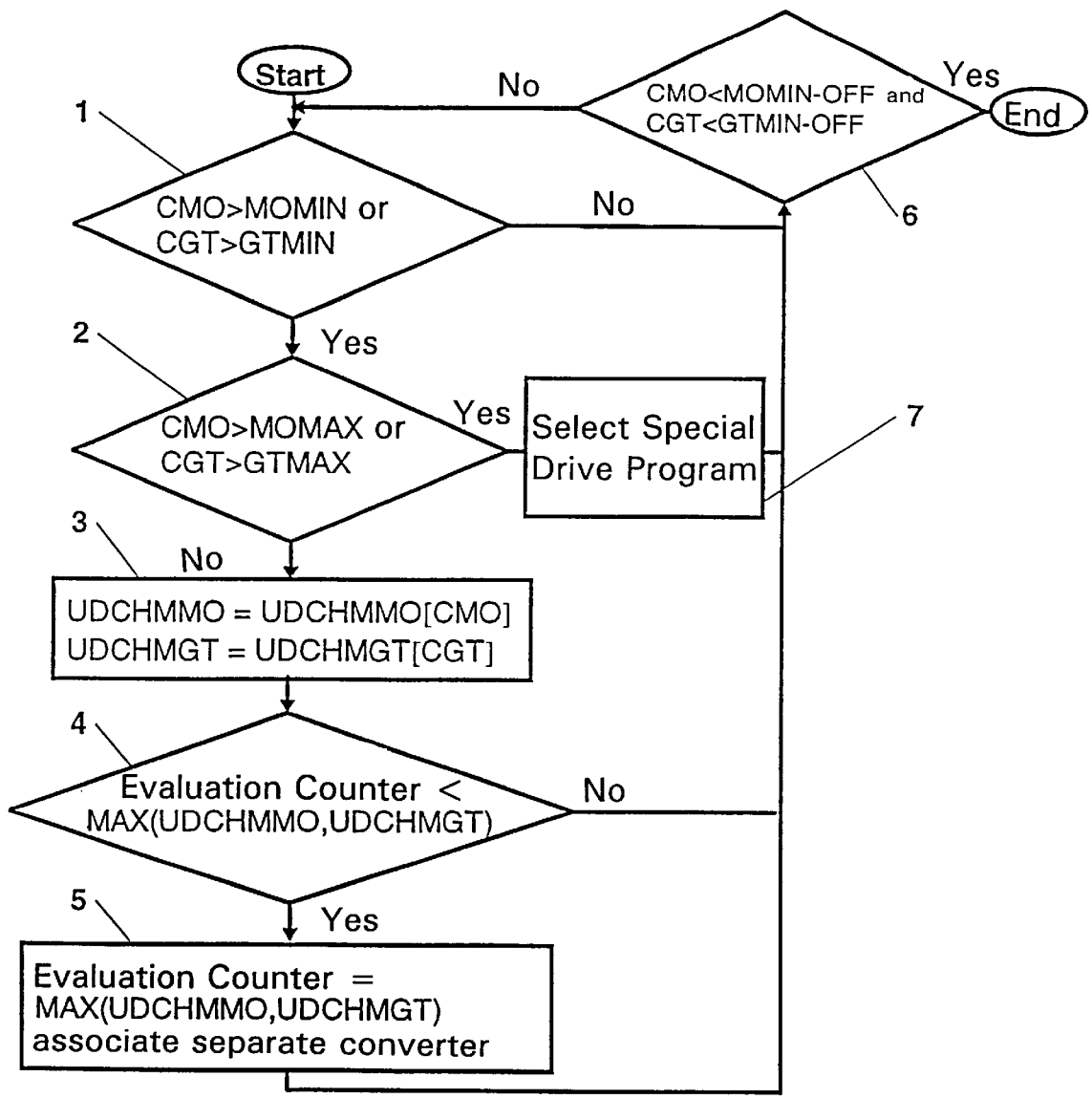
FIG. 1 is a program flow chart of an embodiment of the invention.

According to the flow chart of FIG. 1, the program is programmed in the electronic control unit and is cyclically run though during the operation. In interrogation block 1 is tested whether the engine cooling water temperature CMO is higher than a first limit value MOMIN or the transmission sump temperature CGT is higher than a first transmission temperature limit value GTMIN. If this is the case, in interrogation block 2 is tested whether the engine temperature CMO is higher than a second engine transmission temperature limit value MOMAX or the transmission sump temperature than a second transmission temperature limit value GTMAX. If this is not the case, the temperature limit value are, therefore, between the first and second limit values. In this case, an engine high-temperature operating value UDCHMMO dependent on the engine cooling water temperature CMO and a transmission high-temperature operating value UDCHMGT dependent on the transmission sump temperature are determined in block 3.

Figure 2:
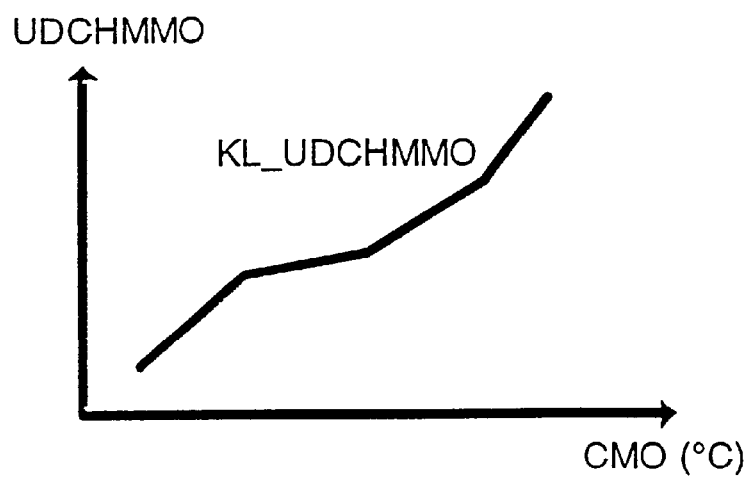
FIG. 2, is a characteristic line of an engine high-temperature operating value.

FIG. 2. shows the characteristic line $KL_{13}$ UDCHMMO for the engine high-temperature operating value stored in the electronic control unit according to the engine temperature CMO. In interrogation block 4 (FIG. 1) is tested whether the last applicable value of the evaluation counter is lower than the higher value of engine high-temperature operating value and transmission high-temperature operating value. If this is not the case, a former performance-oriented drive program, with increased rotational speed level, is already accessed. In the other case, the evaluation counter is set equal to the higher of the high-temperature operating values for the engine or the transmission. Besides, a first high-temperature converter shift program is accessed.

With the value of the evaluation counter, assigned in block 5, a shift program is associated which also has a temperature-lowering properties. For example, the downshift characteristic lines of the shift program are laid so that, except in the starting gear, an engine rotational speeds no lower than 2200 1/min, for example, appear. By the increased rotational speed level, on one side, and by the limited operation with open converter lock-up clutch, on the other, a lowering of the temperature is obtained in many cases. In block 6 is tested whether the engine cooling water temperature CMO is lower than a third engine temperature limit value MOMIN-OFF and the transmission sump temperature CGT is lower than a third transmission temperature limit value GTMIN-OFF. The third limit values are here lower by the offset amount OFF than the first temperature limit values. Therefore, if the temperatures were lowered by the high-temperature operating mode to the extent that the condition is satisfied, the function can be terminated. In this case, the evaluation counter is again provided with the driving activity characteristic.

If it established in interrogation block 2 that the engine or the transmission temperature has already gone beyond the second temperature limit value, a special optimized high-temperature drive program is accessed in block 7 which comprises both a shift program for a gear change control and a converter shift program for control of the lock-up clutch. This special high-temperature program remains active until both the third engine temperature limit value and the third transmission temperature limit value have been fallen below.

REFERENCES 1 interrogation block
2 interrogation block
3 block
4 interrogation block
5 block
6 interrogation block
7 block
CMO engine cooling water temperature
MOMIN first engine temperature limit value
CGT transmission sump temperature
CTMIN first transmission temperature limit value
MOMAX second engine temperature limit value
GTMAX second transmission temperature limit value
UDCHMMO engine high-temperature operating value
UDCHMGT transmission high-temperature operating value

What is claimed is:

1. A method for controlling a high-temperature operating mode of an electronically controlled automatic transmission in which at least one temperature value of one of an actual engine (CMO) and a transmission (CGT) temperature is continuously measured and said actual temperature value (CMO, CGT) is compared with an upper limit value (MOMAX, GTMAX), and a special high-temperature shift program is accessed for a gear change control when the actual temperature value is higher than the upper limit value (MOMAX, GTMAX), the method comprising the steps of:

storing several shift programs in an electronic control unit for gear change control;

accessing one of the stored several shift programs according to an evaluation counter normally provided with a driving activity characteristic;

associating a consumption-optimized shift program with a minimum value of the evaluation counter and associating a performance-optimized shift program with a maximum value of the evaluation counter;

comparing the actual temperature value (CMO. CGT) with a lower smaller limit value (MOMIN; GTMIN) and, when the actual temperature (CMO, CGT) is higher than the lower limit value (MOMIN, GTMIN) and the upper limit values (MOMAX, GTMAX) still have not been reached, providing the evaluation counter with a high-temperature operating value (MAX (UDCHMMO, UDCHMGT) with which a more performance-optimized shift program, having temperature-lowering properties, is associated.

2. The method according to claim 1, further comprising the steps of front-mounting a hydrodynamic converter with a lock-up clutch on the automatic transmission and accessing a first high-temperature converter shift program when the actual temperature value (CMO, CGT) is higher than the lower limit value (MOMIN, GTMIN).

3. The method according to claim 2, further comprising the step of accessing a second high-temperature converter shift program when the actual temperature value (CMO, CGT) is higher than the upper limit value (MOMAX, GTMAX).

4. The method according to claim 11, further comprising the step of comparing the actual temperature value (CMO, CGT) with a third limit value (MOMIN-OFF, GTMIN-OFF) and again providing the evaluation counter with the actual value of the driving activity characteristic when the actual temperature value (CMO, CGT) is lower than the third limit value.

5. The method according to claim 1, further comprising the steps of continuously measuring both an actual transmission temperature (CGT) and an actual engine temperature (CMO);

comparing the engine temperature value (CMO) with a lower temperature limit value (MOMIN) and comparing the transmission temperature value (CGT) with a lower transmission temperature limit value (GTMIN); and providing the evaluation counter with a high-temperature operating value (MAX(UDCHMMO, UDCHMGT) when at least one of the temperature values (CMO, CGT) is higher than the corresponding lower limit value (MOMIN, GTMIN).

6. The method according to claim 5, further comprising the steps of comparing the engine temperature value (CMO) with an upper engine temperature limit value (MOMAX), comparing the transmission temperature value (CGT) with an upper transmission temperature limit value (GTMAX), and accessing a special high-temperature shift program, for a gear change control, when at least one of the temperature values is higher than the corresponding upper limit value.

7. The method according to claim 5, further comprising the step of setting the high-temperature operating value (MAX(UDCHMMO, UDCHMGT)) equal to the maximum from and engine high-temperature operating value (UDCHMMO) and a transmission high-temperature operating value (UDCHMGT).

8. The method according to claim 5, further comprising the step of setting the high-temperature operating value equal to the medium value from an engine high-temperature operating value (UDCHMMO) and a transmission high-temperature operating value (UDCHMGT).

9. The method according to claim 1, further comprising the step of determining at least one of the high-temperature operating value and the high-temperature operating values (UDCHMMO, UDCHMGT) according to one of the actual engine temperature value (CMO) and transmission temperature value (CGT), with higher temperature operating values are assigned to high temperature values.

10. The method according to claim 1, further comprising the step of determining temperature gradients from a timed curve of the temperature values and determining the lower (MOMIN, GTMIN) and the upper (MOMAX, GTMAX) limit values according to the temperature gradients, low limit values being assigned to high temperature gradients.

11. The method according to claim 1, further comprising the step of measuring an outside temperature and determining the lower and the upper limit values according to the measured outside temperature.

12. The method according to claim 11, further comprising the step of assigning especially low limit values to a low measured outside temperature.

13. The method according to claim 1, further comprising the step of measuring the air pressure and determining the upper and lower limit values according to the measured air pressure, especially low limit values being assigned to low air pressure values.

14. The method according to claim 13, further comprising the step of assigning especially low limit values to a low measured air pressure value.

15. The method according to claim 1, further comprising the step of the determining a value of road gradient and determining the lower and the upper limit values according to the determined value of the road gradient.

16. The method according to claim 13, further comprising the step of assigning especially low limit values to a low determined value of the road gradient.

17. The method according to claim 1, further comprising the step of providing an optical indication to a driver when a transmission temperature limit value is exceeded.

18. A method for controlling a high-temperature operating mode of an electronically controlled automatic transmission in which at least one temperature value of one of an actual engine (CMO) and a transmission (CGT) temperature is continuously measured and said actual temperature value (CMO, CGT) is compared with an upper limit value (MOMAX, GTMAX), and a special high-temperature shift program is accessed for a gear change control when the actual temperature value is higher than the upper limit value (MOMAX, GTMAX), the method comprising the steps of:

storing several shift programs In an electronic control unit for gear change control;

accessing one of the stored several shift programs according to an evaluation counter normally provided with a driving activity characteristic;

associating a consumption-optimized shift program with a minimum value of the evaluation counter and associating a performance-optimized shift program with a maximum value of the evaluation counter;

comparing the actual temperature value (CMO, CGT) with a lower smaller limit value (MOMIN; GTMIN) and, when the actual temperature (CMO, CGT) is higher than the lower limit value (MOMIN, GTMIN) and the upper limit values (MOMAX, GTMAX) still have not been reached, providing the evaluation counter with a high-temperature operating value (MAX (UDCHMMO, UDCHMGT) with which a more performance-optimized shift program, having temperature-lowering properties, is associated; and providing the evaluation counter with the actual value of the driving activity characteristic when the actual engine temperature value (CMO) is lower than a third engine temperature limit value (MOMIN-OFF) and the actual transmission temperature value (CGT) is lower than a third transmission temperature limit value (GTMIN-OFF).

19. A method for controlling a high-temperature operating mode of an electronically controlled automatic transmission in which at least one temperature value of one of an actual engine (CMO) and a transmission (CGT) temperature is continuously measured and said actual temperature value (CMO, CGT) is compared with an upper limit value (MOMAX, GTMAX), and a special high-temperature shift program is accessed for a gear change control when the actual temperature value is higher than the upper limit value (MOMAX, GTMAX), the method comprising the steps of;

storing several shift programs in an electronic control unit for gear change control;

accessing one of the stored several shift programs according to an evaluation counter normally provided With a driving activity characteristic;

associating a consumption-optimized shift program with a minimum value of the evaluation counter and associating a performance-optimized shift program with a maximum value of the evaluation counter;

comparing the actual temperature value (CMO, CGT) with a lower smaller limit value (MOMIN; GTMIN) and, when the actual temperature (CMO, CGT) is higher than the lower limit value (MOMIN, GTMIN) and the upper limit values (MOMAX, GTMAX) still have not been reached, providing the evaluation counter with a high-temperature operating value (MAX (UDCHMMO, UDCHMGT) with which a more performance-optimized shift program, having temperature-lowering properties, is associated; and assigning a high-temperature operating value to the evaluation counter only when a last applicable value of the evaluation counter is lower than the high-temperature operating value to be assigned.

* * * * *